Aug. 19, 1952 H. SENGEBUSCH 2,607,855

X-Y SWITCH FOR A TELEPHONE SYSTEM

Original Filed Dec. 18, 1947 4 Sheets-Sheet 1

INVENTOR.
Hans Sengebusch

BY

Smith, Olsen & Baird
Attys.

INVENTOR.
Hans Sengebusch

BY
Smith, Olsen & Baird
Attys

X-Y SWITCH FOR A TELEPHONE SYSTEM

Original Filed Dec. 18, 1947 4 Sheets-Sheet 3

INVENTOR.
Hans Sengebusch
BY
Smith, Olsen & Baird
Attys

X-Y SWITCH FOR A TELEPHONE SYSTEM

Original Filed Dec. 18, 1947 4 Sheets-Sheet 4

INVENTOR.
Hans Sengebusch
BY
Smith, Olsen & Baird
Attys.

Patented Aug. 19, 1952

2,607,855

UNITED STATES PATENT OFFICE 2,607,855

X-Y SWITCH FOR A TELEPHONE SYSTEM

Hans Sengebusch, Villa Park, Ill., assignor to Automatic Electric Laboratories, Inc., Chicago, Ill., a corporation of Delaware Original application December 18, 1947, Serial No. 792,510. Divided and this application May 13, 1950, Serial No. 161,780

2 Claims. (Cl. 179—27.52)

The present invention relates to switching apparatus for telephone systems, and more particularly to such apparatus of the so-called X—Y motions or flat type. This application is a division of the copending application of Hans Sengebusch, Serial No. 792,510, filed December 18, 1947, now Patent No. 2,578,095, granted December 11, 1951.

It is an object of the present invention to provide in switching apparatus of the type including a primary carriage and a secondary carriage, improved mechanism for selectively operating the primary and secondary carriages and for restoring the secondary and primary carriages.

Another object of the invention is to provide in switching apparatus of the type noted, improved mechanism of the direct drive type for selectively operating the primary and secondary carriages and improved spring mechanism for restoring the secondary and primary carriages.

A further object of the invention is to provide in automatic switching apparatus including a drive bar, improved motor means for selectively operating and for restoring the drive bar.

Further features of the invention pertain to the particular arrangement of the elements of the switching apparatus whereby the above-outlined and additional operating features thereof are attained.

Figure 1:
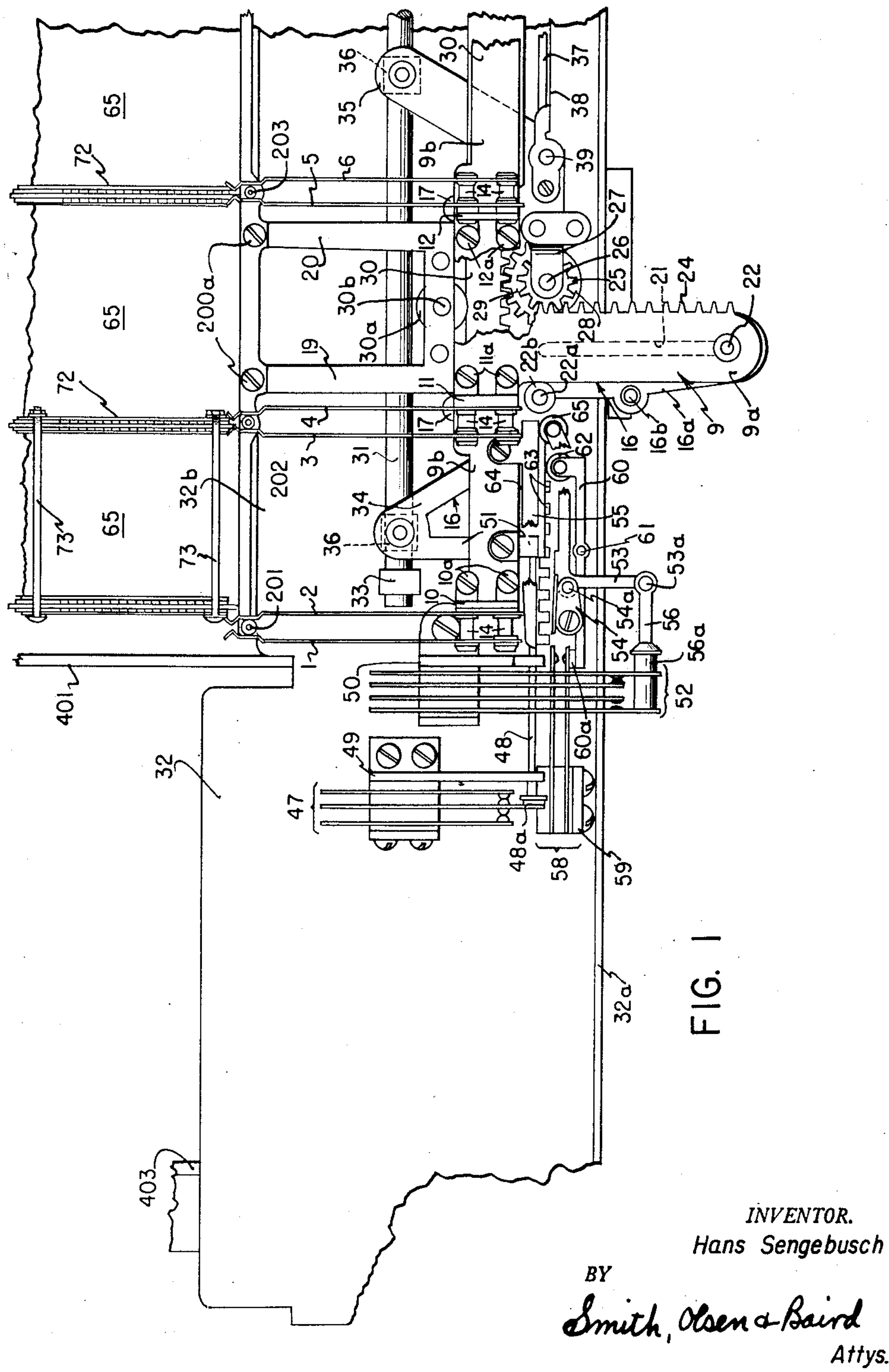
Figure 1A:
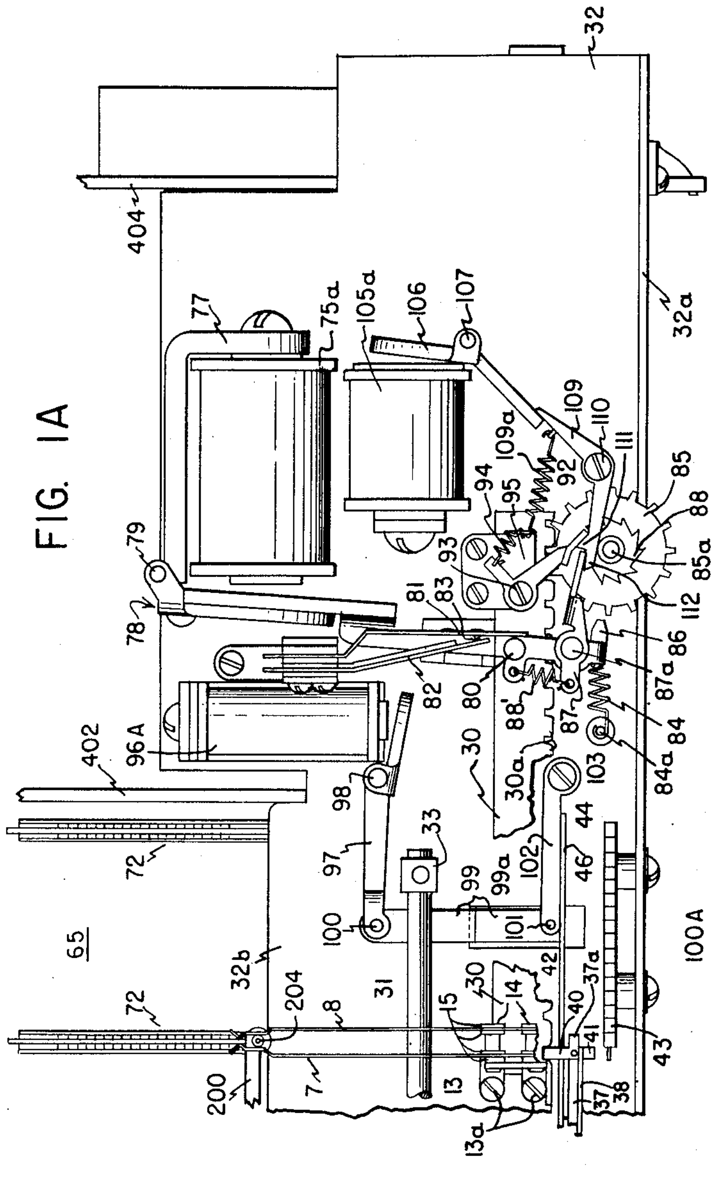
Figure 2:
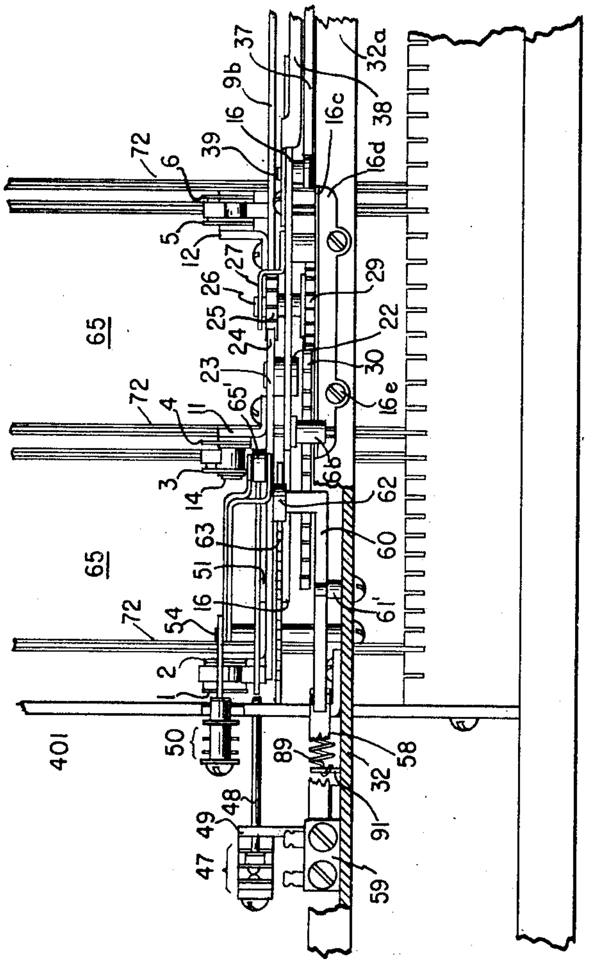
Figures 5, 6:
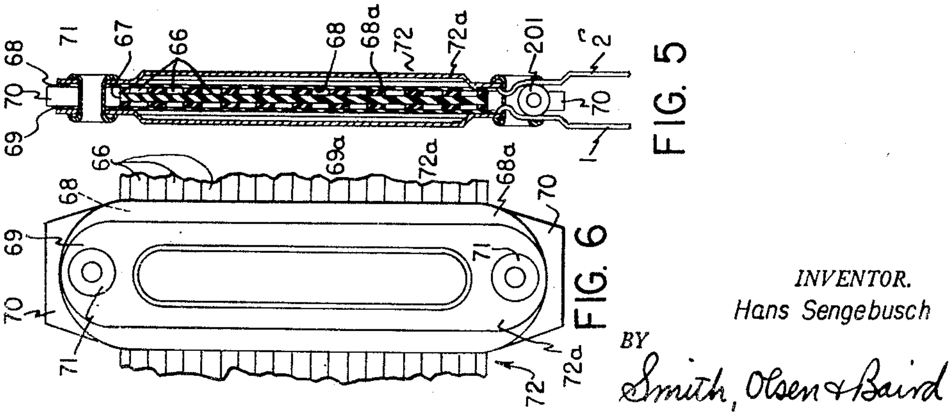
Figures 2A, 3, 4:
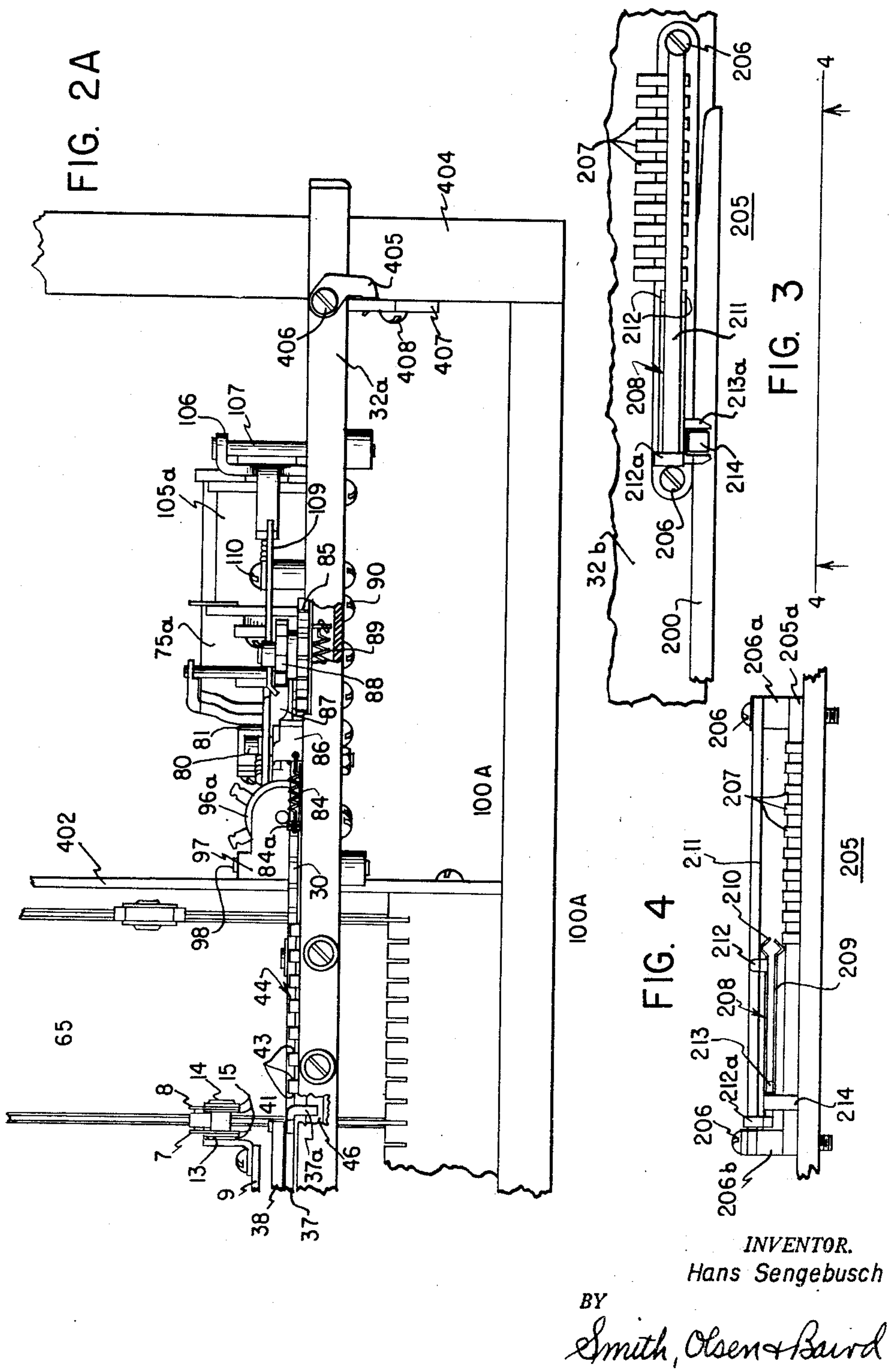

The invention, both as to its organization and method of operation, together with further objects and advantages thereof, will best be understood by reference to the following specification taken in connection with the accompanying drawings, in which Figures 1 and 1A, taken together, are a plan view, partly broken away, of switching apparatus embodying the present invention; Figs. 2 and 2A, taken together, are a front elevational view, partly broken away, of the switching apparatus; Fig. 3 is a bottom view of a fragmentary central portion of the base plate of the switching apparatus, illustrating the cooperation between the primary carriage thereof and an associated set of control contacts; Fig. 4 is a fragmentary inverted front elevational view, taken in the direction of the arrows along the line 4—4 in Fig. 3, of the central portion of the base plate of the switching apparatus and the associated elements; Fig. 5 is a plan view of a contact bank unit that may be associated with the switching apparatus; and Fig. 6 is a fragmentary end view of the contact bank unit shown in Fig. 5.

Referring now more particularly to Figs. 1, 1A, 2 and 2A, the switching apparatus there illustrated comprises the switching mechanism 100A of the direct drive type, contact bank structure 65 and supporting structure including two vertically extending and longitudinally spaced apart elements 401 and 402 and two horizontally extending and longitudinally spaced apart elements 403 and 404. The switching mechanism 100A comprises a longitudinally extending base plate 32 provided with an upwardly turned front flange **32*a* and a rearwardly extending apron 32*b*. The base plate 32 is supported upon the horizontal elements 403 and 404 and the rear edge thereof abuts the front edges of the vertical elements 401 and 402, the apron 32*b* being arranged between the longitudinally spaced apart vertical elements 401 and 402; whereby the normal position of the base plate 32 is accurately located by the vertical elements 401 and 402 upon the horizontal elements 403 and 404 so that the switching mechanism 100A occupies a predetermined and exact position with respect to the associated contact bank 65. The base plate 32 is normally retained in its normal position by locking devices disposed at the opposite ends thereof and cooperating with the horizontal elements 403 and 404; the locking element 405 carried by the right-hand end of the base plate 32 being illustrated. Specifically, the locking element 405 is pivotally mounted by a screw 406 upon the front flange 32*a* and cooperates with a locking dog 407 secured by a screw 408 to the horizontal element 404. Thus it will be understood that the base plate 32 may be readily removed with respect to the supporting structure, including the vertical elements 401 and 402 and the horizontal elements 403 and 404, merely by sliding it toward the front away from the contact bank 65 after the locking elements 405, etc., have been disengaged. Accordingly, the switching apparatus 100A** may be readily placed upon and removed from the associated supporting structure for purposes of inspection and repair.

The contact bank 65 is of the 200-point of line type, each line including a positive conductor, a positive conductor, a negative conductor and two control conductors; whereby the contact bank 65 comprises 800 individual contact strips accessible to the switching apparatus 100A. Specifically, the contact bank 65 comprises forty individual contact units 72 arranged in four groups of ten each; each individual contact unit 72 comprising twenty individual contact strips. Each individual contact unit 72 is of the bare contact strip type extending vertically in the contact bank 65. The contact bank 65 is accessible to a number of switching mechanisms including the switching mechanism 100A, carried by the supporting structure in a vertical tier; whereby the contact bank 65 serves as a multiple between the different switching mechanisms for marking purposes.

All of the elements of the switching mechanism 100A are secured to the base plate 32 so that they are properly positioned with respect to the contact bank 65 when the base plate 32 is positioned upon the supporting structure as previously explained. Specifically, the switching mechanism 100A comprises contact controlling mechanism in the form of eight main individual wipers 1, 2 and 3, 4 and 5, 6 and 7, 8; the individual wipers 1, 3, 5 and 7 constituting a first wiper set having access to 100 lines, and the individual wipers 2, 4, 6 and 8 constituting a second wiper set having access to 100 lines. Specifically, the wipers 1 and 2 may comprise positive line wipers having access to the positive line conductors of the two groups of 100 lines each; the wipers 3 and 4 may comprise negative line wipers having access to the negative line conductors of the two groups of 100 lines each; the wipers 5 and 6 may comprise first control wipers having access to the first control conductors of the two groups of 100 lines each; and the wipers 7 and 8 may comprise second control wipers having access to the second control conductors of the two groups of 100 lines each.

The two wiper sets are capable both of selective primary or longitudinal movement from the left toward the right and of selective secondary or lateral movement from the front toward the rear. Specifically, the two wiper sets are capable of ten individual steps of longitudinal movement and of ten individual steps of lateral movement. Since each of the four sections of the contact bank 65 are respectively associated with two corresponding ones of the individual wipers, each of the 200 lines is accessible to the two wiper sets. Moreover, when a given number of steps of longitudinal movement is imparted to the two wiper sets, the four corresponding contact units 72 are selected thereby; and when a given number of steps of lateral movement is imparted to the two wiper sets, eight individual contact strips comprising two lines in the four selected contact units 72 are selected. Accordingly, each combined longitudinal and lateral position of the two wiper sets corresponds to two individual lines in the contact bank 65 respectively selected by the two wiper sets. Finally, the first wiper set comprising the individual wipers 1, 3, 5 and 7 is connected by a first set of flexible conductors, not shown, to a first terminal block, not shown, carried by the base plate 32; and the second wiper set comprising the individual wipers 2, 4, 6 and 8 is connected by a second set of flexible conductors, not shown, to a second terminal block, not shown, carried by the base plate 32.

Considering now the construction of the switching mechanism 100A in greater detail, the base plate 32 carries a longitudinally extending guide rod 31, the opposite end of which are anchored in openings formed in two blocks 33 directly secured to the upper surface of the base plate 32. A longitudinally slidable primary carriage 16 is supported upon the guide rod 31 and comprises two centrally disposed rearwardly extending arms 19 and 20 and two outer rearwardly extending arms 34 and 35, as well as a centrally disposed forwardly projecting arm 16*a*. The arms 34 and 35 carry downwardly projecting blocks 36 provided with openings through which the guide rod 31 extends; while the arm 16*a* carries a downwardly projecting fixture 16*b* having a longitudinally extending slot, not shown, formed in the rear edge thereof into which the upper flange 16*c* of a guide element 16*d* rides, the guide element 16*d* being secured by two screws 16*e* upon the front flange 32*a* of the base plate 32. Finally, the outer ends of the arms 19 and 20 carry a longitudinally extending bracket 200 disposed adjacent to the rear edge of the apron 32*b*; the bracket 200 being secured to the outer ends of the arms 19 and 20 by two screws 200*a*. The primary carriage 16 has a normal longitudinal position toward the left and is capable of longitudinally sliding movement toward the right; the primary carriage 16 being guided in its primary movement by the cooperation between the fixture 16*b* carried by the arm 16*a* and the flange 16*c* of the guide element 16*d* carried by the front flange 32*a* of the base plate 32 and by the cooperation between the blocks 36 carried by the arms 34 and 35 and the guide rod 31.

A laterally slidable secondary carriage 9 is carried by the primary carriage 16; the secondary carriage 9 being substantially T-shaped having a forwardly projecting stem 9*a* overlying the arm 16*a* of the primary carriage 16 and a longitudinally extending head 9*b* overlying the arms 34 and 35 of the primary carriage 16. The outer end of the stem 9*a* carries a downwardly extending rivet 22 provided with a groove positioned in a laterally extending slot 21 formed in the arm 16*a*. Also the left-hand side of the arm 16*a* carries an upstanding pin 22*a* carrying a roller 22*b* engaging the left-hand edge of the stem 9*a*. Finally, two rollers 17 are mounted on the lower surface of the head 9*b* and respectively engage the outer edge of the arm 19 and the outer edge of the arm 20. The secondary carriage 9 has a normal lateral position toward the front and is capable of lateral sliding movement with respect to the primary carriage 16; the lateral sliding movement being guided by the cooperation between the rivet 22 and the slot 21 by the cooperation between the roller 22*b* and the adjacent edge of the stem 9*a* and by the cooperation between the rollers 17 and the adjacent outer edges of the arms 19 and 20.

The head 9*b* of the secondary carriage 9 carries four longitudinally spaced apart brackets 10, 11, 12 and 13 respectively secured thereto by screws 10*a*, 11*a*, 12*a* and 13*a*. The bracket 10 carries two rivets 14 supporting the main wipers 1 and 2 in longitudinally spaced apart relation with respect to each other by virtue of an arrangement including a plurality of intervening insulating strips; the bracket 11 carries two rivets 14 supporting the main wipers 3 and 4 in longitudinally spaced apart relation with respect to each other by virtue of an arrangement including a plurality of intervening insulating strips; the bracket 12 carries two rivets 14 supporting the main wipers 5 and 6 in longitudinally spaced apart relation with respect to each other by virtue of an arrangement including a plurality of intervening insulating strips; and the bracket 13 carries two rivets 14 supporting the main wipers 7 and 8 in longitudinally spaced apart relation with respect to each other by virtue of an arrangement including a plurality of intervening insulating strips. The bracket 200 carries four longitudinally spaced apart upstanding insulating bushings 201, 202, 203 and 204 disposed between the respective pairs of main wipers 1, 2, and 3, 4 and 5, 6 and 7, 8 in order to maintain the individual wipers of each pair out of contact with each other when they occupy their fully retracted positions toward the front of the base plate 32.

The primary carriage 16 comprises a normal longitudinal position and may be moved step by step therefrom in the longitudinal direction from the left toward the right as previously noted; and the secondary carriage 9 comprises a normal lateral position and may be moved step by step therefrom in the lateral direction from the front toward the rear as previously noted. In order to accomplish these movements of the primary carriage 16 and of the secondary carriage 9, an arrangement is provided comprising a longitudinally extending drive bar 30 in the form of a rack having a normal longitudinal position toward the left and capable of stepped movement in the longitudinal direction toward the right. The longitudinal movement of the rack 30 is guided by a stationary fixture 95 secured to the right-hand end of the base plate 32 and having a slot formed therein receiving and guiding the right-hand end of the rack 30 and by a roller 30*a* mounted upon a pin 30*b* carried by the primary carriage 16. The rack 30 is normally restrained in its normal longitudinal position toward the left by a coil spring 89, one end of the coil spring 89 being secured to a pin 91 carried by the base plate 32 and the other end of the coil spring 89 being secured to a pin 90 carried by the rack 30.

The primary carriage 16 has an opening 28 formed therein through which a vertically disposed pin 26 extends, the upper end of the pin 26 being arranged in an opening formed in a bracket 27 secured to the primary carriage 16 and the lower end being secured to a lower fixture, not shown, carried by the primary carriage 16. Upper and lower gears 25 and 29 are rigidly secured to the pin 26, the lower gear 29 meshing with the teeth provided on the front side of the rack 30 and the gear 25 meshing with teeth provided on a rack portion 24 of the stem 9*a*. Accordingly, the secondary carriage 9 comprises the rack 24 meshing with the gear 25 carried by the pin 26, and the rack 30 meshes with the gear 29 carried by the pin 26.

Further the primary carriage 16 carries a downwardly projecting pivot pin 39 supporting the left-hand end of a latch lever 37 as well as a leaf spring 38 urging the latch lever 37 in the counterclockwise direction about the pivot pin 39. The right-hand end of the latch lever 37 carries a rearwardly projecting latch 40 normally engaging a notch 42 formed in the front edge of the rack 30 and a forwardly projecting latch 41 adapted to engage any one of ten notches 43 provided in an upstanding latch plate 44 secured to the front flange 32*a* adjacent to the right-hand end thereof. The notches 43 formed in the latch plate 44 are spaced apart distances corresponding to the longitudinal steps of the primary carriage 16. Accordingly, it will be understood that the leaf spring 38 normally urges the latch 40 into the notch 42 formed in the rack 30 thereby latching the primary carriage 16 to the rack 30. In order to control the position of the latch lever 37, an arrangement is provided comprising a shift magnet 96A provided with magnetic structure secured to the right-hand end of the base plate 32. The shift magnet 96A carries a pivot pin 98 upon which an armature 97 is mounted, the outer end of the armature 97 carrying a pin 100 to which the rear end of a slide 99 is secured. The body portion of the slide 99 is bent downwardly and arranged in a guiding opening 99*a* formed in the base plate 32 and the front end of the slide 99 carries a pin 101 to which the left-hand end of a lever 102 is secured, the right-hand end of the lever 102 being secured to a screw 103 carried by the base plate 32. Finally, the front end of the slide 99 carries a longitudinally extending upstanding trip 46 disposed between the front of the rack 30 and a downwardly projecting lug 37*a* formed on the extreme right-hand end of the latching lever 37. Accordingly, the leaf spring 38 not only biases the latching lever 37 in the counterclockwise direction about the pivot pin 39, but it also causes the lug 37*a* carried thereby to engage the trip 46 and urge it toward the rear; whereby the slide 99 is moved toward the rear rotating the lever 102 in the clockwise direction about the screw 103 and rotating the armature 97 in the clockwise direction about the pivot pin 98.

In order to control movement of the rack 30 from its normal longitudinal position toward the right, an arrangement is provided comprising a drive magnet 75A provided with magnetic structure including a heel piece 77 secured to the right-hand end of the base plate 32. The heel piece 77 carries a pivot pin 79 upon which an armature 78 is pivotally mounted. Also, the right-hand end of the base plate 32 carries an upstanding pin 85*a* upon which an upper ratchet 88 and a lower gear 85 are journaled, the ratchet 88 being rigidly secured to the gear 85. The teeth provided on the gear 85 engage corresponding teeth 30*a* formed on the front edge of the rack 30; and the ratchet 88 cooperates with a pawl 87 carried by the armature 78. More particularly, the pawl 87 is pivotally mounted on a pivot pin 87*a* disposed on the outer end of the armature 78 and is normally biased in the clockwise direction about the pivot pin 87*a* into engagement with the ratchet 88 by an arrangement comprising a coil spring 88′ extending between the armature 78 and the outer left-hand end of the pawl 87. The armature 78 is normally biased in the clockwise direction about the pivot pin 79 by an arrangement including a coil spring 84, one end of the coil spring 84 being secured to an upstanding pin 84*a* carried by the base plate 32 and the other end of the coil spring 84 being secured to the extreme outer end of the armature 78. Also the extreme outer end of the armature 78 carries a detent 86 adapted to cooperate with the teeth on the gear 85 in a manner more fully explained hereinafter. Further a detent 92 is pivotally mounted upon the fixture 95 by a pivot pin 93 and is normally biased in the clockwise direction into engagement with the ratchet 88 by an arrangement including a coil spring 94 extending between the detent 92 and the fixture 95.

Further the switching mechanism 100A comprises a release magnet 105A provided with magnetic structure secured to the right-hand end of the base plate 32. The release magnet 105A is provided with an armature 106 mounted upon a pivot pin 107 carried by the base plate 32 and cooperating with a release dog 109 mounted upon a pivot pin 110 carried by the base plate 32. The release dog 109 is normally biased in the counterclockwise direction about the pivot pin 110 by an arrangement including a coil spring 109*a* extending between the release dog 109 and the fixture 95. The left-hand end of the release dog 109 comprises two fingers 111 and 112 respectively disposed between the detent 92 and the ratchet 88 and between the pawl 87 and the ratchet 88.

Considering now the operation of the switching mechanism 100A, the primary carriage 16 normally occupies its normal longitudinal position toward the left; the secondary carriage 9 normally occupies its normal lateral position toward the front; and the rack 30 normally occupies its normal longitudinal position toward the left. Moreover, the latch lever 37 is normally biased by the leaf spring 38 in the counterclockwise direction about the pivot pin 39; whereby the latch 40 engages the notch 42 formed in the rack 30 locking the primary carriage 16 to the rack 30. At this time, when the winding of the drive magnet 75A is energized, the armature 78 is attracted and rotated in the counterclockwise direction about the pivot pin 79 against the bias of the coil spring 84; whereby the pawl 87 engaging the associated tooth on the ratchet 88 rotates the ratchet 88 and consequently the gear 85 one step in the clockwise direction about the pivot pin 85*a*. At the end of the stroke, the detent 86 formed on the outer end of the armature 78 engages the associated tooth on the gear 85 preventing further rotation thereof in the clockwise direction. Also, at this time, the detent 92 urged by the coil spring 94 rides over one tooth on the ratchet 88 and engages the next adjacent tooth thereon, thereby to prevent return movement of the ratchet 88 in the counterclockwise direction. When the winding of the drive magnet 75A is then deenergized, the armature 78 is released and rotated in the clockwise direction about the pivot pin 79 by the coil spring 84, the detent 86 disengaging the associated tooth on the ratchet 88 in order to condition the pawl 87 to drive the ratchet 88 an additional step in the clockwise direction. When the gear 85 is thus rotated one step in the clockwise direction, the teeth thereon engaging the teeth 30*a* on the rack 30 slide the rack 30 from its normal longitudinal position one step toward the right against the bias of the coil spring 89. When the rack 30 is thus driven from its normal longitudinal position one step toward the right, the primary carriage 16 latched thereto by the latch 40 moves therewith from its normal longitudinal position one step toward the right. When the primary carriage 16 is driven away from its normal longitudinal position one step toward the right, the two wiper sets are brought into longitudinal alignment with respect to the two corresponding first groups of ten lines in the two 100-line groups in the associated contact bank 65. Thus it will be understood that by energizing the winding of the drive magnet 75A a number of times, while the primary carriage 16 is latched to the rack 30 by the latch 40, the primary carriage 16 is driven a corresponding number of steps away from its normal longitudinal position toward the right in order to cause the two wiper sets to select the two corresponding groups of ten lines in the two 100-line groups in the associated contact bank 65.

After the primary carriage 16 has been operated as described above the required number of steps away from its normal longitudinal position, the winding of the shift magnet 96A is energized; whereby the armature 97 is attracted and rotated in the counterclockwise direction about the pivot pin 98 moving the slide 99 toward the front of the base plate 32 through the pin 100. When the slide 99 is thus moved toward the front of the base plate 32 the lever 102 is rotated about the screw 103 due to the connection of the slide 99 thereto by the pin 101; whereby the trip 46 is moved toward the front flange 32*a* rotating the latch lever 37 in the clockwise direction about the pivot pin 39 against the bias of the leaf spring 38 due to the engagement between the trip 46 and the lug 37*a* carried by the latch lever 37. More particularly, when the primary carriage 16 is moved away from its normal longitudinal position one or more steps in the longitudinal direction toward the right, the latch lever 37 is moved therewith and into alignment with a corresponding one of the notches 43 formed in the latch plate 44. Accordingly, at this time when the latch lever 37 is rotated by the trip 46 in the clockwise direction about the pivot pin 39, the latch 40 disengages the notch 42 formed in the rack 30 and the latch 41 engages the aligned notch 43 formed in the latch plate 44; hence, the primary carriage 16 is unlatched from the rack 30 by the disengagement of the latch 40 and the notch 42; and the primary carriage 16 is latched against further movement in the longitudinal direction by the engagement between the latch 41 and the aligned notch 43.

At this time while the winding of the shift magnet 96A is energized, the winding of the drive magnet 75A is energized; whereby the armature 78 causes the pawl 87 to drive the ratchet 88 an additional step in the clockwise direction causing the gear 85 to drive the rack 30 an additional step in the longitudinal direction toward the right. At this time the smooth front surface of the rack 30 disposed between the teeth 30*a* formed on the right-hand end thereof and the teeth formed on the left-hand end thereof engaging the gear 25 rides to the right past the latch 40; whereby the notch 42 formed in the rack 30 is no longer aligned with respect to the latch 40. At this time the winding of the shift magnet 96A may be deenergized in order to release the armature 97; whereby the armature 97 is rotated only through a small angle in the clockwise direction about the pivot pin 98 since the slide 99 is not forced rearwardly by the leaf spring 38 acting through the latching lever 37 and the trip 46. Specifically, the end of the latch 40 engages the associated smooth front edge of the rack 30 relieving the force of the latch lever 37 upon the trip 46. Accordingly the smooth front surface of the rack 30 restrains the latch lever 37 in its rotated position in the clockwise direction about the pivot pin 39; whereby the latch 41 is restrained in the aligned notch 43 formed in the latch plate 44.

Accordingly, at this time the primary carriage 16 is latched against further longitudinal movement and the rack 30 is free to slide with respect thereto; whereby the rack 30 is slid with respect to the primary carriage 16 effecting rotation of the gear 29 one step in the clockwise direction with the pivot pin 26. Thus the pin 26 is rotated one step in the clockwise direction causing the gear 25 to be rotated therewith in order to drive the meshing rack 24 one step toward the rear of the base plate 32. Specifically, the secondary carriage 9 is moved away from its normal lateral position one step in the lateral direction toward the rear of the base plate 32 with respect to the primary carriage 16; whereby the two wiper sets supported by the secondary carriage 9 are driven into engagement with the first contact strips in the contact units 72 previously selected by the longitudinal movement of the primary carriage 16. Thus the two wiper sets mentioned select the first two corresponding lines in the previously selected two groups of ten lines each. Thus it will be understood that by energizing the winding of the drive magnet 75A an additional number of times following the energization of the winding of the shift magnet 96A and the consequent operation of the latch lever 37, the secondary carriage 9 may be driven a corresponding number of steps toward the rear of the base plate 32. Hence, it will be understood that by energizing the winding of the drive magnet 75A the additional number of times mentioned the secondary carriage 9 is driven a corresponding number of steps away from its normal lateral position toward the rear of the base plate 32 in order to cause the two wiper sets to select two corresponding lines in the two previously selected groups of ten lines each. Thereafter one of the two lines thus selected may be selected by external relays, not shown, merely by selecting one of the two wiper sets mentioned.

Recapitulating, primary operation of the drive magnet 75A prior to operation of the shift magnet 96A effects primary operation of the primary carriage 16; while secondary operation of the drive magnet 75A subsequent to operation of the shift magnet 96A effects secondary operation of the secondary carriage 9. For example, in the event the drive magnet 75A is operated X number of times prior to operation of the shift magnet 96A, and is then operated Y number of times subsequent to operation of the shift magnet 96A, the primary carriage 16 is operated X steps in the longitudinal direction and the secondary carriage 9 is operated Y steps in the lateral direction; whereby the X longitudinal position and the Y lateral position set the two wiper sets carried by the secondary wiper carriage 9 to select the two corresponding lines in the two groups of 100 lines each.

In order to release the switching mechanism 100A, after operation thereof in the manner described above, the winding of the release magnet 105A is energized attracting and rotating the armature 106 in the counterclockwise direction about the pivot pin 107, whereby the release dog 109 is rotated in the clockwise direction about the screw 110 against the bias of the coil spring 109$a$. When the release dog 109 is thus operated, the fingers 111 and 112 respectively engage the detent 92 and the pawl 87 rotating the detent 92 in the counterclockwise direction about the screw 93 against the bias of the coil spring 94 and rotating the pawl 87 in the counterclockwise direction about the pivot pin 87$a$ against the bias of the coil spring 88′. Accordingly, the detent 92 and the pawl 87 are moved out of engagement with the two corresponding teeth on the ratchet 88; whereby the ratchet 88 and the gear 85 are free to rotate upon the pin 85$a$. At this time the coil spring 89 restores the rack 30 toward the left causing the teeth on the left-hand end thereof to rotate the gear 29 in the counterclockwise direction; whereby the pin 26 carrying the gear 25 is thus rotated bringing about retraction of the rack 24. More particularly, the gear 25 rotating in the counterclockwise direction drives the rack 24 toward the front of the base plate 32; whereby the secondary carriage 9 is slid with respect to the primary carriage 16 back into its normal lateral position. When the secondary carriage 9 is thus restored to its normal lateral position, the rack 30 has moved toward the left by the coil spring 89 to bring the notch 42 formed therein into alignment with the latch 40 carried by the latch lever 37; whereby the leaf spring 38 rotates the latch lever 37 in the counterclockwise direction about the pivot pin 39 forcing the latch 40 into the notch 42. Accordingly, at this time the latch 41 carried by the latch lever 37 disengages the associated notch 43 formed in the latch plate 44; whereby the primary carriage 16 is latched to the rack 30 for movement therewith and is unlatched with respect to the base plate 32. Continued movement of the rack 30 toward the left by the coil spring 89 effects sliding of the primary carriage 16 toward the left along the guide rod 31. Accordingly, the rack 30 is restored toward the left back into its normal longitudinal position carrying the primary carriage 16 therewith; whereby the primary carriage 16 is restored toward the left back into its normal longitudinal position.

After the secondary carriage 9 and the primary carriage 16 have been released and restored back into the normal lateral position and the normal longitudinal positions thereof, respectively, the winding of the release magnet 105$a$ is deenergized; whereby the armature 106 is released and rotated in the clockwise direction about the pivot pin 107 by the coil spring 109$a$ incident to rotation of the release dog 109 in the counterclockwise direction, thereby about the pivot pin 110. At this time the fingers 111 and 112 carried by the release dog 109 disengage the detent 92 and a pawl 87, respectively; whereby the coil spring 94 rotates the detent 92 in the clockwise direction about the pivot pin 93 back into engagement with an associated tooth of the ratchet 88 and the coil spring 88′ rotates the pawl 87 in the clockwise direction about the pivot pin 87$a$ back into engagement with an associated tooth in the ratchet 88. At this time the switching mechanism 100A is completely released.

Further the switching mechanism 100A comprises the primary control contact structure 205 shown in Figs. 3 and 4 and including an insulating base plate 205$a$ secured to the lower surface of the central portion of the apron 32$b$ of the base place 32 adjacent to the rear edge thereof by a pair of screws 206 extending through tapped openings formed in the apron 32$b$. Also the structure 205 comprises two insulating bushings 206$a$ surrounding the screws 206 and a conducting guide rail 211 extending therebetween. The guide rail 211 is disposed below the insulating base plate 205$a$ and carries longitudinally slidable wiper structure 208 including two individual wipers 209 and 210 and a connecting insulator 213. A band 212$a$ is secured to the insulator 213 and surrounds the guide rail 211 and the wiper 210 is provided with two downwardly extending tabs 212 embracing the sides of the guide rail 211. Further, the insulating base 205$a$ carries a series of ten longitudinally spaced apart contacts 207 cooperating with the wiper 209; the individual contacts 207 being spaced apart longitudinally distances corresponding to the respective steps of the primary carriage 16 in the longitudinal direction. Finally, the insulator 213 comprises two tabs 213$a$ arranged in spaced apart relation and receiving a lug 214 secured to the lower surface of the bracket 200. The wiper structure 208 occupies a normal longitudinal position when the primary carriage 16 occupies its normal longitudinal position; and when the primary carriage 16 is moved step by step away from its normal longitudinal position toward the right, the wiper structure 208 is likewise moved away from its normal longitudinal position step by step toward the right. As noted above, the longitudinal spacings of the individual contacts 207 correspond to the steps of the primary carriage 16; whereby the wiper 209 engages a given individual contact 207 when the primary carriage 16 occupies its corresponding longitudinal stepped position. Finally, the wiper 210 engages the guide rail 211 at each step of the wiper structure 208. Thus it will be understood that the guide rail 211 may be selectively connected to the individual contacts 207 at the corresponding individual steps of the primary carriage 16; which arrangement may be employed for control and supervisory purposes in an obvious manner.

Also the switching mechanism 100A comprises a set of primary off-normal switch springs 47. The set of switch springs 47 is mounted upon a bracket 49 by suitable intervening insulating strips; which bracket 49 is suitably secured to the left-hand upper surface of the base plate 32. Also the switching mechanism 100A comprises a set of secondary off-normal switch springs 52. The set of switch springs 52 is mounted upon a bracket 50 by suitable intervening insulating strips; which bracket 50 is suitably secured to the left-hand upper surface of the base plate 32. The set of switch springs 47 is provided with an operating rod 48 slidably mounted in two aligned openings formed in the brackets 49 and 50 and carries an insulator 48*a* on the left-hand end thereof for operating the individual switch springs of the set 47. The right-hand end of the operating rod 48 engages a fixture 51 carried on the arm 34 of the primary carriage 16. Accordingly, when the primary carriage 16 is moved away from its normal longitudinal position one step toward the right, the fixture 51 disengages the right-hand end of the operating rod 48 causing the insulator 48*a* carried on the left-hand end of the operating rod 48 to operate the individual contacts of the set 47. A fixture 54 is secured to the left-hand upper surface of the base plate 32 and carries a pivot pin 54*a* upon which a bell-crank 53 is mounted. The bell-crank 53 is substantially L-shaped including one leg extending longitudinally toward the right and carrying a roller 65 and another leg extending forwardly and carrying a pivot pin 53*a* to which a link 56 is secured, the link 56 supporting an insulator 56*a* connected to the individual switch springs of the set 52. The roller 65 normally engages a fixture 55 secured to the secondary carriage 9. When the secondary carriage 9 is moved away from its normal lateral position one step toward the rear, the fixture 55 disengages the roller 65; whereby the bell-crank 53 is rotated in the counterclockwise direction about the pivot pin 54*a* causing the link 56 to operate through the insulator 56*a*, the individual switch springs of the set 52. Accordingly, the set of switch springs 47 is operated when the primary carriage 16 is operated from and back to its normal longitudinal position; and similarly, the set of switch springs 52 is operated when the secondary carriage 9 is operated from and back to its normal lateral position.

Further the switching apparatus 100A comprises a set of impulsing springs 58 mounted upon a bracket 59 by suitable intervening insulating strips; which bracket 59 is suitably secured to the left-hand upper surface of the base plate 32. The switch springs 58 are operated by an insulator 60*a* carried by a lever 60 mounted upon a pivot pin 61 and carrying a roller 62 on the outer end thereof that cooperates with a comb-like fixture 63 suitably secured to the arm 34 of the primary carriage 16. As the primary carriage 16 is moved from its normal longitudinal position toward the right, the teeth on the comb-like fixture 63 carried thereby engage and disengage the roller 62; whereby the lever 60 is pivoted first in the clockwise direction about the pivot pin 61 and then in the counterclockwise direction about the pivot pin 61; whereby the insulator 60*a* carried thereby operates the set of switch springs 58 to transmit a corresponding series of impulses.

Considering now the construction and arrangement of the contact bank 65 associated with the switching apparatus 100A in greater detail, it will be observed, as shown in Figs. 1, 1A, 5 and 6, that each of the four sections of the contact bank 65 comprises an assembly of ten individual contact units 72 retained in assembled relation by a plurality of bolts 73. Specifically each contact unit 72 comprises a centrally disposed insulating body 67 in the form of a flat strip having ten laterally spaced apart grooves formed in each surface thereof and carrying ten individual flat strip conductors 66 on each surface thereof arranged in the grooves mentioned. The strip conductor 66 disposed on each side of the insulating body 67 are retained in place in the grooves mentioned by a series of vertically spaced apart clamps 72A. Each of the clamps 72A comprises front and rear insulating sheets 68 and 69 overlying the respective surfaces of the strip conductors 66 arranged in the grooves mentioned formed in the respective front and rear surfaces of the insulating body 67, front and rear clamping plates 68*a* and 69*a* and two intervening spacing blocks 70. Finally, the elements of each clamp 72A are retained in assembled relation by two eyelets 71 respectively extending through the spacing blocks 70, as well as the adjacent ends of the clamping plates 68*a* and 69*a* and the adjacent ends of the insulating sheets 68 and 69. The eyelets 70 are of the hollow variety having an opening extending therethrough adapted to receive the clamping bolts 73 previously noted; whereby ten of the contact units 72 may be securely retained in stacked relation. The thickness of the insulating sheets 68 and 69 and the clamping plates 68*a* and 69*a* are such that the bodies 67 of each two adjacent contact units 72 are spaced longitudinally from each other a distance corresponding to one longitudinal step of the primary carriage 16 of the switching mechanism 100A so that when the ten assembled contact units 72 comprising a section in the contact bank 65 are supported by the associated supporting structure adjacent to the switching mechanism 100A that the contact strips 66 carried by the bodies 67 are spaced longitudinally corresponding to the various longitudinally stepped positions of the two associated main wipers carried by the secondary carriage 9. Also it is noted that the clamps 72*a* are spaced vertically apart in order to define a plurality of effective contact sections of each contact unit 72 therebetween that are, in turn, respectively accessible to the various wiper sets of the various switching mechanism 100A, etc., arranged in the vertical tier in the supporting structure. Accordingly, the sections of the contact strips covered by the clamps 72A constitute connecting multiples between the effective contact sections thereof that may be employed for marking purposes between the wiper sets of the various switching mechanisms having access thereto.

Recapitulating it is pointed out that the switching mechanisms 100A, etc., are carried by the supporting structure including the elements 401, 402, 403, 404, etc., in vertically stacked relation in what may be termed the Z direction. Likewise, the contact bank 65 extends vertically providing adjacent sections spaced apart substantially the fixed distance "Z" in the Z direction and accessible to the respective switching mechanisms. In each section of the contact bank 65, the ten individual contact units 72 are spaced longitudinally apart substantially the fixed distance "X" in the X direction and corresponding to the longitudinal steps of the primary carriages of the switching mechanisms 100A, etc. Further, the four sections of the contact bank 65 are spaced longitudinally apart corresponding to the distances between the various pairs of wipers in the two individual sets of switching mechanisms in the two wiper sets of the switching mechanisms 100A, etc. Finally, in each contact unit 72, the individual contact strips 66 are spaced apart laterally the substantially fixed distance "Y" in the Y direction corresponding to the lateral steps of the secondary carriages of the switching mechanisms 100A, etc.

In view of the foregoing, it is apparent that there has been provided in automatic switching apparatus of the type including primary and secondary carriages, improved mechanism for selectively operating the primary and secondary carriages and for restoring the secondary and primary carriages.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. Switching apparatus comprising a support, a primary carriage carried by said support and having a normal primary position and mounted for primary movement with respect thereto, a secondary carriage carried by said primary carriage and having a normal secondary position and mounted for secondary movement with respect thereto, a contact controlling element carried by said secondary carriage, a drive bar carried by said support and having a normal position and mounted for movement with respect thereto, a spring normally biasing said drive bar into its normal position, means including a drive magnet for imparting to said drive bar selective movements in a given direction away from its normal position against the bias of said spring, latching means normally restraining said drive bar against return movement in the opposite direction back into its normal position, means including a release magnet for tripping said latching means so that said spring moves said drive bar in said opposite direction back into its normal position, drive mechanism having a normal position and an operated position, said drive mechanism in its normal position being responsive to initial movement in said given direction of said drive bar for correspondingly operating said primary carriage away from said normal primary position, said drive mechanism in its operated position being responsive to continued movement in said given direction of said drive bar for correspondingly operating said secondary carriage away from said normal secondary position, said drive mechanism in its operated position being responsive to initial movement in said opposite direction of said drive bar for correspondingly restoring said secondary carriage to said normal secondary position, said drive mechanism in its normal position being responsive to continued movement in said opposite direction of said drive bar for correspondingly restoring said primary carriage to said normal primary position, means including a shift magnet for moving said drive mechanism from its normal position to its operated position, restraining means operative in response to said continued movement in said given direction of said drive bar for holding said drive mechanism in its operated position independently of said shift magnet, and means responsive to restoration of said secondary carriage back into said normal secondary position for releasing said restraining means and for moving said drive mechanism from its operated position back to its normal position.

2. Switching apparatus comprising a support, a primary carriage carried by said support and having a normal primary position and mounted for primary movement with respect thereto, a secondary carriage carried by said primary carriage and having a normal secondary position and mounted for secondary movement with respect thereto, a contact controlling element carried by said secondary carriage, a drive bar carried by said support and having a normal position and mounted for movement with respect thereto, a spring normally biasing said drive bar into its normal position, means including a drive magnet and an associated pawl and ratchet mechanism for imparting to said drive bar selective step-by-step movements in a given direction away from its normal position against the bias of said spring, latching means normally restraining said drive bar against return movement in the opposite direction back into its normal position, means including a release magnet for tripping said latching means so that said spring moves said drive bar in said opposite direction back into its normal position, drive mechanism having a normal position and an operated position, said drive mechanism in its normal position being responsive to initial movement in said given direction of said drive bar for correspondingly operating said primary carriage away from said normal primary position, said drive mechanism in its operated position being responsive to continued movement in said given direction of said drive bar for correspondingly operating said secondary carriage away from said normal secondary position, said drive mechanism in its operated position being responsive to initial movement in said opposite direction of said drive bar for correspondingly restoring said secondary carriage to said normal secondary position, said drive mechanism in its normal position being responsive to continued movement in said opposite direction of said drive bar for correspondingly restoring said primary carriage to said normal primary position, means including a shift magnet for moving said drive mechanism from its normal position to its operated position, restraining means operative in response to said continued movement in said given direction of said drive bar for holding said drive mechanism in its operated position independently of said shift magnet, and means responsive to restoration of said secondary carriage back into said normal secondary position for releasing said restraining means and for moving said drive mechanism from its operated position back to its normal position.

HANS SENGEBUSCH.

REFERENCES CITED

The following references are of record in the file of this patent:

UNITED STATES PATENTS

| Number | Name | Date |
|---|---|---|
| 2,052,059 | Sengebusch | Aug. 25, 1936 |
| 2,148,824 | Lienzen | Feb. 28, 1939 |
| 2,218,833 | Sengebusch | Oct. 22, 1940 |
| 2,218,834 | Sengebusch | Oct. 22, 1940 |
| 2,433,256 | Baker | Dec. 23, 1947 |

FOREIGN PATENTS

| Number | Country | Date |
|---|---|---|
| 85,768 | Switzerland | Mar. 10, 1936 |
| 176,065 | Great Britain | Mar. 6, 1920 |